United States Patent
Chiba et al.

(10) Patent No.: US 7,187,459 B2
(45) Date of Patent: Mar. 6, 2007

(54) PRINTING SYSTEM IN WHICH PROGRAMS REQUIRED FOR PRINTER OPERATION ARE DOWNLOADED FROM COMPUTER

(75) Inventors: Noriyoshi Chiba, Nagano-Ken (JP); Kazuyoshi Utsumi, Nagano-Ken (JP); Michio Yoshitake, Nagano-Ken (JP); Michitoshi Ishihara, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 782 days.

(21) Appl. No.: 10/198,049

(22) Filed: Jul. 19, 2002

(65) Prior Publication Data

US 2003/0025932 A1 Feb. 6, 2003

(30) Foreign Application Priority Data

Jul. 19, 2001 (JP) ............................. 2001-220274
Feb. 19, 2002 (JP) ............................. 2002-041300

(51) Int. Cl.
*G06F 3/12* (2006.01)
*G06K 1/00* (2006.01)

(52) U.S. Cl. .................... 358/1.13; 358/1.15; 709/203; 717/168

(58) Field of Classification Search ............... 358/1.13, 358/1.15; 709/203; 710/15; 717/120, 168
See application file for complete search history.

(56) References Cited

U.S. PATENT DOCUMENTS

| 6,681,392 B1 * | 1/2004 | Henry et al. | ................ | 717/176 |
| 2003/0191790 A1 * | 10/2003 | Horiyama | .................... | 709/100 |

FOREIGN PATENT DOCUMENTS

| JP | S60-254287 | | 12/1985 |
| JP | H01-188374 | | 7/1989 |
| JP | H01-204768 | | 8/1989 |
| JP | H03-140279 | | 6/1991 |
| JP | 05-011940 A | | 1/1993 |
| JP | 07-129343 A | | 5/1995 |
| JP | 08-123635 | * | 5/1996 |
| JP | H08-123635 | | 5/1996 |

(Continued)

*Primary Examiner*—Kimberly Williams
*Assistant Examiner*—Dillon Murphy
(74) *Attorney, Agent, or Firm*—Sughrue Mion, PLLC

(57) ABSTRACT

A printing system that comprises a host computer 50 and a printer 10 in combination. As the printer 10, is used one that can process a first class print request including a control program and print data and a second class print request including only print data, and, when an ID output request is received, sends a control program ID as identification information of a control program stored inside the printer 10 at that point of time. Printer control software 20a is installed on the host computer 50 to put the computer 50 in a state that, when a print request is to be outputted to the printer 10, the computer 50 verifies whether a required control program is stored within the printer 10, and the computer 50 sends a second class print request to the printer 10, when storing of the control program is verified, and sends a first class print request to the printer 10, when storing of the control program is not verified. Thus, it is possible to realize a printing system including a such type of printer that can process print data of various language and downloads a control program, having a shorter average time required for printing.

6 Claims, 15 Drawing Sheets

FOREIGN PATENT DOCUMENTS

| | | |
|---|---|---|
| JP | 08-310059 A | 11/1996 |
| JP | H08-310059 | 11/1996 |
| JP | 9-34663 A | 2/1997 |
| JP | 10-187362 A | 7/1998 |
| JP | 10-289077 A | 10/1998 |
| JP | 11-225216 A | 8/1999 |
| JP | 2000-015900 A | 1/2000 |
| JP | 2000-018544 A | 1/2000 |
| JP | 2000-105702 A | 4/2000 |
| JP | 2001-067228 * | 3/2001 |
| JP | 2001-67228 | 3/2001 |

* cited by examiner

PRINTING SYSTEM IN WHICH PROGRAMS REQUIRED FOR PRINTER OPERATION ARE DOWNLOADED FROM COMPUTER

TECHNICAL FIELD

The present invention relates to a printing system, and particularly, to a printing system in which programs required for printer operation are downloaded from a computer.

BACKGROUND ART

A printer, which receives print data from a host computer and performs printing based on the received print data, comprises: a print engine unit that performs mechanical processing for actually forming an image on a printing medium such as a sheet of paper; and in addition, a printer control unit that performs control of communication with the host computer, interpretation of print data, control of the print engine unit, and the like.

This printer control unit stores programs for interpreting print data and controlling printing processing of a printer, and can control the printer when a CPU of the printer performs processing according to those programs. Conventionally, those programs are contained in the printer, being recorded in advance in a ROM as a nonvolatile storage medium.

However, in order to store all programs required for printer operation into a ROM, it is necessary to employ a ROM of a large capacity. This is a main cause of impeding cost reduction, which is particularly required recently.

Thus, for example, Japanese Unexamined Patent Laid-Open Nos. 1-204768 and 2001-67228 propose a technique in which programs required for printer operation are stored not in a ROM of a printer but in a host computer, and downloaded into a RAM of the printer when it is necessary.

In the technique described in 1-204768, a pair of data (i.e., control program and print data sent following the control program) are sent from a host computer to a printer at the time of printing, and the printer performs printing based on the print data, according to the received control program.

Further, in the technique described in 2001-67228, a host computer holds part or all of programs required for printer operation. And, a printer driver compares a state of operation programs in the printer with operation programs required by an application in use, and downloads only necessary modules to the printer each time when printing processing is performed.

SUMMARY OF THE INVENTION

However, the technique described in 1-204768 has a problem that overhead becomes large since the control program is sent each time when printing is performed. In the technique described in 2001-67228, only necessary modules are downloaded. However, a list of modules is used for judging whether each module is necessary or not, and accordingly, a configuration of the printing system becomes intricate. Further, both the techniques described in 1-204768 and 2001-67228 do not consider processing of a printer connected to a plurality of computers. Thus, when such a technique is applied to a network, there can arise a case where a computer from which programs are downloaded is different from a computer that sends print data, and the programs and the print data have no correspondence between them.

An object of the present invention is to provide a simply-configured printing system including a printer of the type that downloads a control program, wherein print data of various languages can be processed and an average time required for printing is shorter than a conventional printing system including such a printer.

Another object of the present invention is to realize a printing system on a network including a plurality of computers, wherein programs required for printer operation are downloaded from a computer.

To accomplish the above first object, according to the present invention, there is provided a printing system including a printer and a host apparatus, wherein:

the printer comprises:

a communication means for communicating with the host apparatus;

a printing means for printing a image on a sheet of paper, with the image corresponding to print image specification data supplied;

a control program storage means for storing a control program;

a kind information output request response means for supplying kind information capable of identifying a kind of the control program stored in the control program storage means, to the host apparatus through the communication means, when a kind information output request is received through the communication means; and a print data processing means for generating the print image specification data and for supplying the generated print image specification data to the printing means, wherein: when a first class print request (which includes a control program in a front part and print data after the control program) is received through the communication means, then, the print data processing means stores the control program included in the first class print request into the control program storage means, and thereafter, generates the print image specification data, by processing the print data included in the first class print request, according to the control program stored in the control program storage means, and when a second class print request (which includes only print data) is received through the communication means, then, the print data processing means generates the print image specification data, by processing the print data included in the second class print request, according to the control program stored in the control program storage means; and the host apparatus comprises:

a control program group storage means for storing a plurality of control programs to supply to the printer;

a generation means for generating print data to be processed by the print data processing means of the printer;

a state judgment means for sending the kind information output request to the printer before sending a print request that includes the print data generated by the generation means, in order to judge whether the printer is in a state that a control program defining a procedure of processing the print data is stored in the control program storage means of the printer, and thus, supply of the control program is not required; and a print request sending means for sending a second class print request (which includes only the print data generated by the generation means) when the state judgment means judges that the printer is in a state of not requiring supply of the control program, and for sending a first class print request (which includes the print data generated by the generation means and, before the print data, the control program defining the procedure of processing the print data, with the control program being stored in the control program group storage means) when the state judgment means judges that the printer is in a state of requiring supply of the control program.

Also, to accomplish the above second object, according to the present invention, there is provided a printing system including a printer and a plurality of computers each send print data to the printer, wherein:

each of the plurality of computers comprises:

a storage means for storing a program required for printing processing of the printer; and a means for acquiring information regarding a program stored in the printer, previous to sending print data, for judging whether sending of the program stored in the computer is required, and for sending the program based on a result of the judgment; and the printer comprises a means for preventing reception of print data or a program from computers other than any one computer when print data or the program is received from the one computer, for storing the received program inside the printer, when a received object is the program, and for performing printing processing based on the received print data, according to the program stored inside the printer, when the received object is the print data.

DETAILED DESCRIPTION

Now, embodiments of the present invention will be described in detail, referring to drawings.

(First Embodiment)

First, referring to FIGS. 1–3, will be described an outline of a printing system according to a first embodiment of the present invention, and a configuration and operation of a printer used in this printing system.

Figure 1:
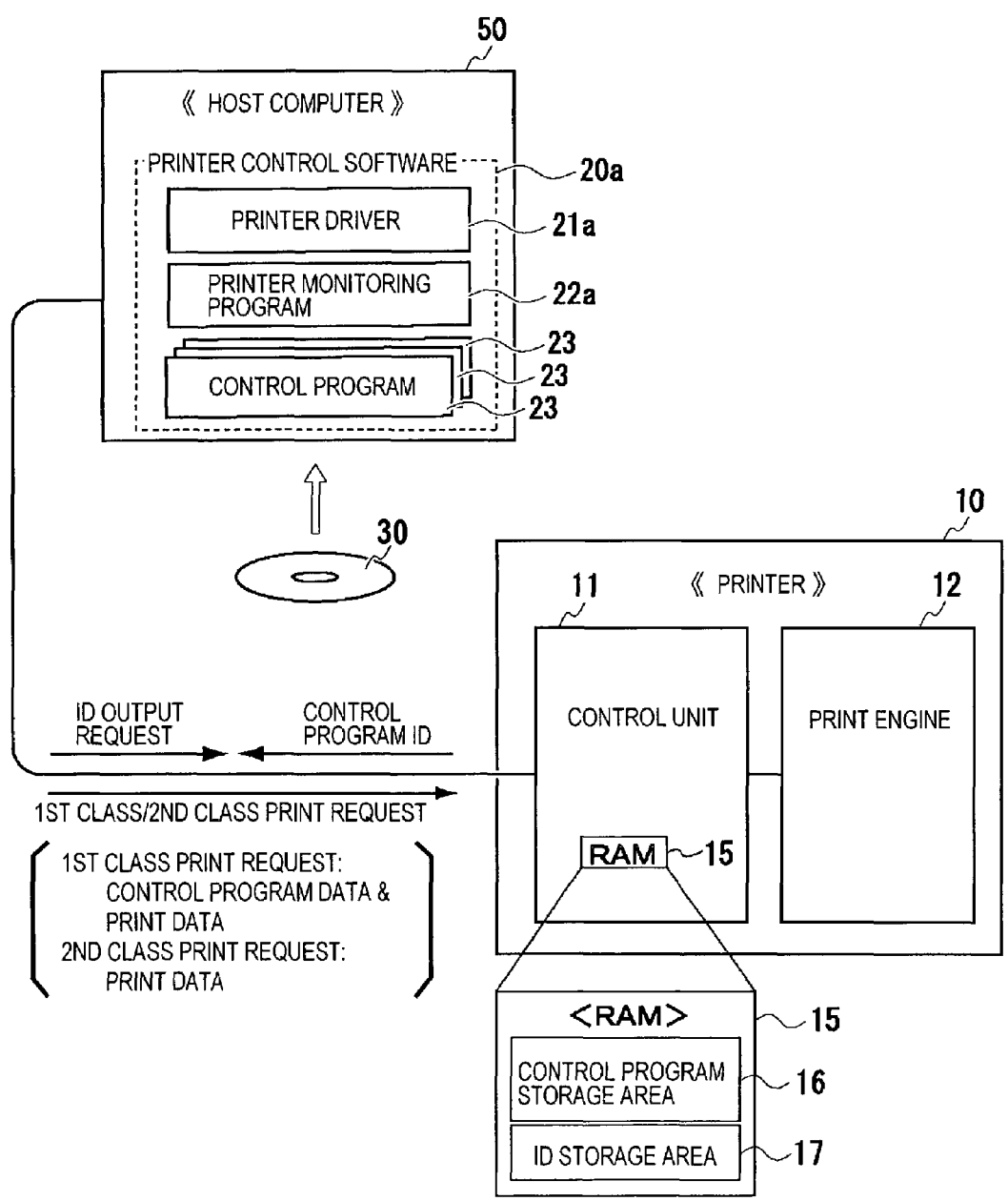
FIG. 1 is an explanatory diagram showing a printing system according to a first embodiment of the present invention.

As shown in FIG. 1, the printing system according to the first embodiment of the present invention comprises a printer 10 and a host computer 50 on which printer control software 20a (its detail will be described below) is installed.

The printer 10 included in the present printing system comprises: a print engine 12 that receives supply of predetermined-format data (hereinafter, referred to as print image specification data) and prints the image specified by the supplied print image specification data, on a sheet of paper; and a control unit 11 that generates print image specification data of a image corresponding to a print request received from the host computer 50 and supplies the generated print image specification data to the print engine 12. Here, as the print request, the present printer 10 can receive (process) a first class print request that includes both control program data and print data and a second class print request that includes print data only, although details will be described below.

The control unit 11 provided in the printer 10 comprises a RAM 15, a CPU, a ROM, a communication interface circuit, an ASIC, etc., although the components other than the RAM 15 are not shown in the figure. The ROM in the control unit 11 records a main program executed by the CPU.

When the printer 10 is started, then, according to the main program, the control unit 11 (CPU) first confirms that each part is in a normally-functionable state, and performs initialization processing for initializing each part requiring initialization. Further, at this initialization processing, the control unit 11 performs processing of preparing a control program storage area 16 and an ID storage area 17 on the RAM 15 in the control unit 11, wherein the control program storage area 16 stores a control program 23, i.e., a program that defines an actual procedure for generating print image specification data, and the IP storage area 17 stores a control program ID (corresponding to kind information) as identification information of the control program 23 stored in the control program storage area 16. In detail, in this processing, the ID storage area 17 is secured, and the top address of the control program storage area 16 is specified and stored.

When the initialization processing is finished, the control unit 11 starts operation in a normal state, in which the control unit 11 awaits (monitors) transmission of a print request, an ID output request (corresponding to a kind information output request), or the like from the host computer 50.

Figure 2:
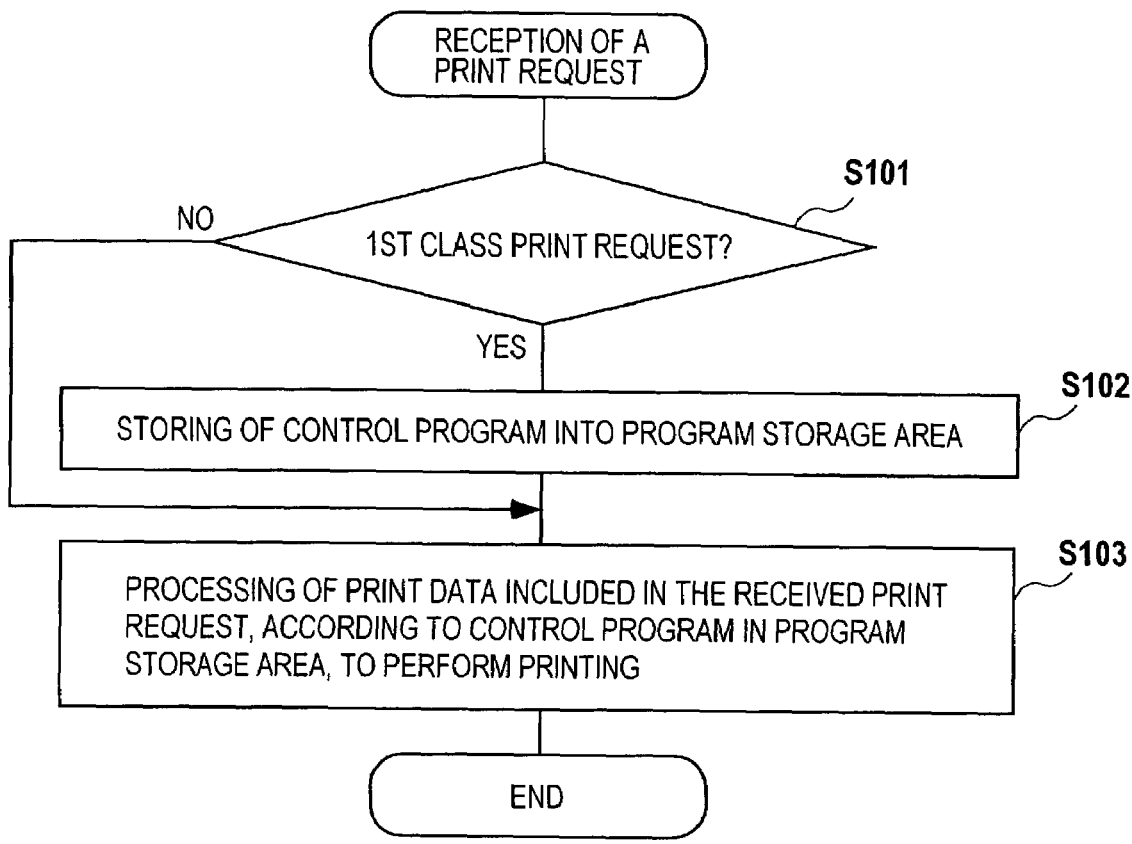
FIG. 2 is a flowchart showing an operation procedure of a printer as a component of the printing system according to the first embodiment, in the case of receiving a print request.

When a print request is received, the control unit 11 performs processing of the procedure shown in FIG. 2 to make the print engine 12 generate a print requested by that print request.

Namely, first, the control unit 11 judges whether the received print request is a first class print request that includes both control program data and print data or a second class print request that includes print data only, by examining whether control program data is included in the front of the print request in question (Step S101).

Figure 3:
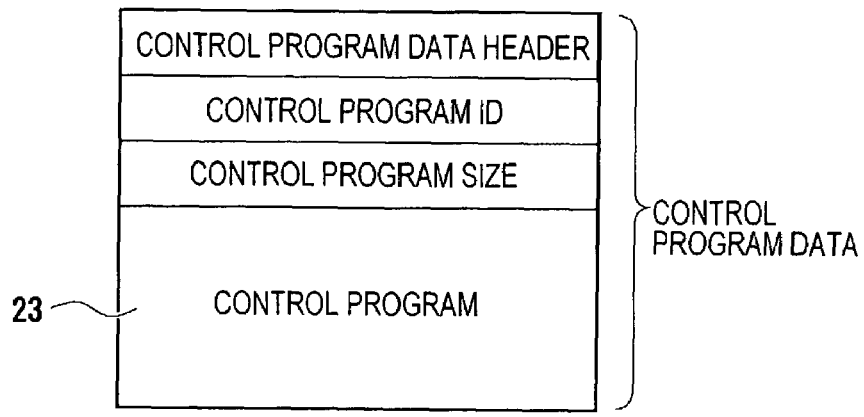
FIG. 3 is an explanatory diagram showing control program data delivered from a host computer to a printer in the printing system according to the first embodiment.

In detail, as shown schematically in FIG. 3, control program data included in a first class print request consists of a control program data header, a control program ID, a control program size, and a control program 23. The control program ID included in the control program data is information of a predetermined size and indicates the kind of the control program 23 included in the same control program data. And, the control program size is information of a predetermined size and indicates the size of the control program 23 included in the same control program data.

The control program data header included in the control program data is information of a predetermined size and indicates that itself and the three pieces of data following it constitute control program data. The control unit 11 judges whether a received print request is a first class print request or a second class print request by examining whether a control program data header is included in the front of the received print request.

When the received print request is a first class print request (Step S101; YES), then, the control unit 11 first stores the control program ID (the data of the predetermined size next to the control program data header) included in the print request in question into the ID storage area 17 in Step S102. Next, the control unit 11 obtains the control program size (the data of the predetermined size next to the control program ID) included in the print request in question. Then, the control unit 11 stores the data (i.e., the control program 23) that are subsequent to the control program size in the print request and have the size indicated by the control program size, into the control program storage area 16.

After thus-described series of processes are performed in Step S102, the control unit 11 processes the print data (in this case, the data subsequent to the control program data) included in the received print request, according to the procedure defined in the control program 23 stored in the control program storage area 16, in order to make the print engine 12 perform printing correspondingly to the print data (Step S103). In detail, in this step S103, the control unit 11 interprets the print data according to the procedure defined in the control program 23 stored in the control program storage area 16, in order to generate print image specification data whose image corresponds to the print data, and supplies the generated print image specification data to the print engine 12.

Then, the control unit 11 finishes the processing of the received print request, and starts the normal state operation.

On the other hand, when the received print request is a second class print request (Step S101; NO), then, the control unit 11 does not performs the processing in Step S102, and goes to Step S103 where the control unit 11 processes the print data (in this case, the print request itself) included in the received print request, according to control program 23 stored in the control program storage area 16. Then, the control unit 11 finishes the processing of the received print request, and starts the normal state operation.

Further, when the control unit 11 operating in the normal state receives an ID output request (corresponding to the kind information output request) sent from the host computer 50, then, the control unit 11 performs processing of returning the control program ID (corresponding to the kind information) stored in the ID storage area 17 to the host computer 50.

Next, referring to FIGS. 1, 4 and 5, will be described a configuration and functions of the printer control software 20a installed on the host computer 50.

As shown in FIG. 1, the printer control software 20a installed on the host computer 50 includes several control programs 23 to be supplied to the printer 10. Further, each of the control programs 23 is provided with a unique control program ID. Further, the printer control software 20a includes a printer driver 21a and a printer monitoring program 22a. The printer control software 20a is installed on the host computer 50 by reading the printer control software 20a from a program storage medium 30 such as a CD-ROM, or by downloading the printer control software 20a from a Web site which is not shown in the figure.

Figure 4:
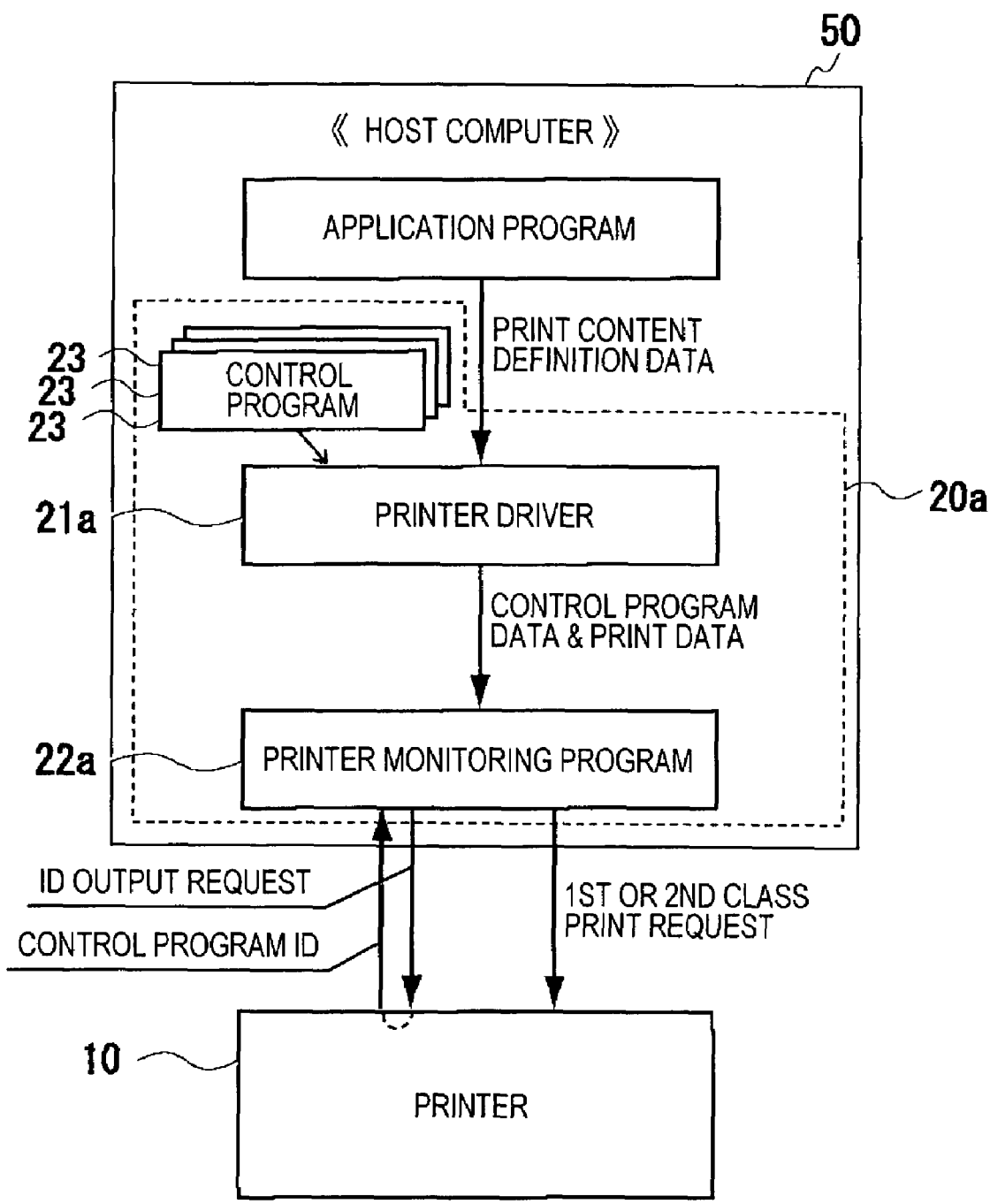
FIG. 4 is a diagram for explaining functions of printer control software that is installed on the host computer as a component of the printing system according to the first embodiment.
Figure 5:
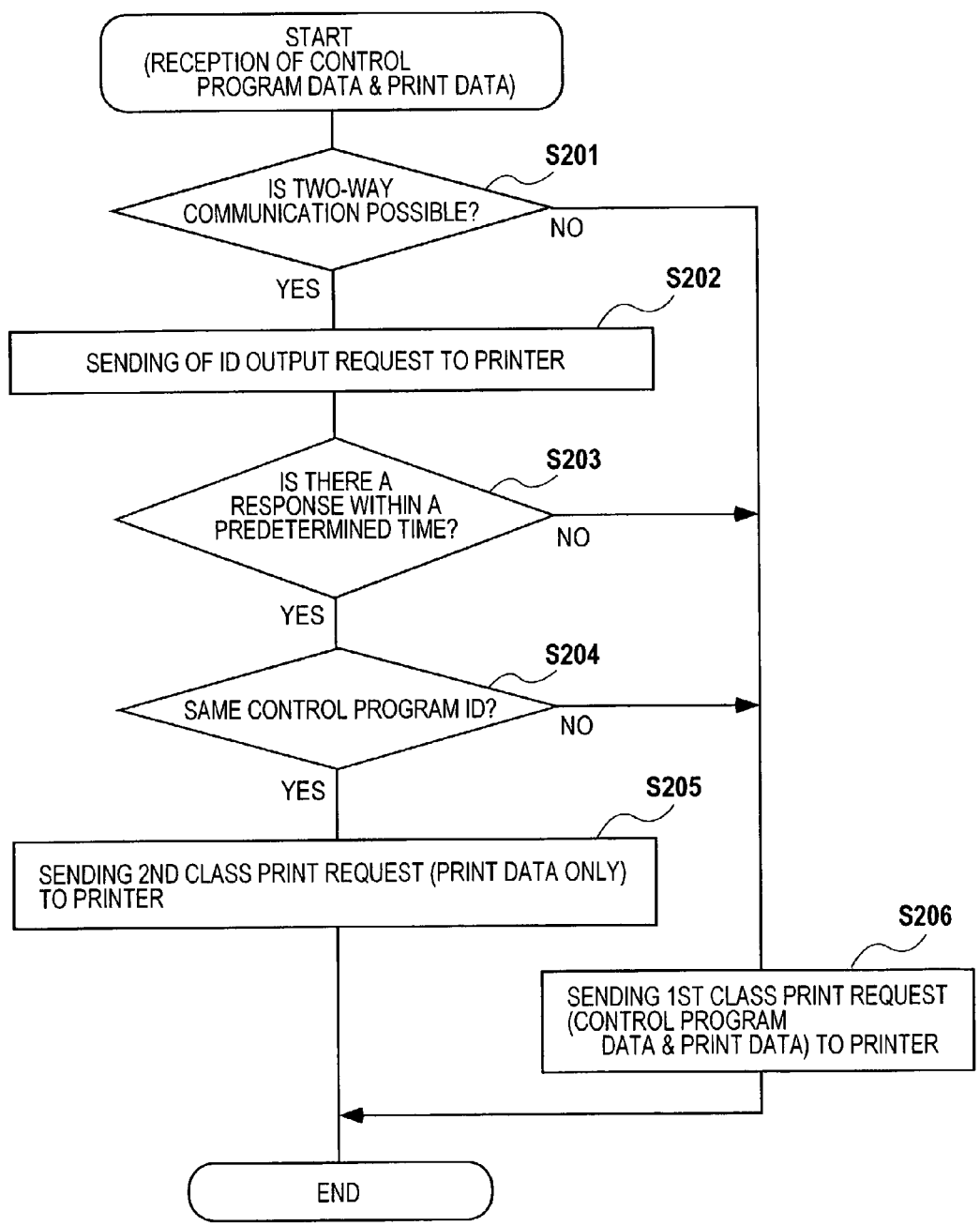
FIG. 5 is a flowchart showing processing executed in the host computer as a component of the printing system according to the first embodiment, under control of a printer monitoring program installed as an element of the printer control software.

As schematically shown in FIG. 4, the printer driver 21a included in the printer control software 20a is a program that generates print data of a designated language, generates (composes) control program data including a control program 23 required for processing the print data, and delivers the print data and the control program data to the printer monitoring program 22a, wherein, the print data are generated based on data (hereinafter, referred to as print content definition data) that are given from an application program and define a content to be printed. In other words, the printer driver 21a is a program that generates a first class print request.

The printer monitoring program 22a is a program in charge of processing of sending a print request to the printer. When the printer driver 21a delivers control program data and print data to the printer monitoring program 22a, then, the host computer 50 performs processing of the procedure shown in FIG. 5, under control of the printer monitoring program 22a.

Namely, first, it is judged whether the host computer 50 and the printer 10 are connected in such a form that two-way communication is possible between them (i.e., a form in which the host computer 50 can obtain information from the printer 10) (Step S201). When the host computer 50 and the printer 10 are not connected in such a form that two-way communication is possible between them (Step S201; NO), then, a first class print request consisting of the control program data and print data, which have been delivered from the printer driver 21a to the printer monitoring program 22a, is sent to the printer 10 (Step S206).

On the other hand, when the host computer 50 and the printer 10 are connected in such a form that two-way communication is possible between them (Step S201; YES), then, an ID output request is sent to the printer 10 (Step S202). When there is no response to the ID output request within a predetermined time (Step S203; NO), then, the processing of Step S206 is performed to send the first class print request to the printer 10.

On the other hand, when there is an answer to the ID output request within the predetermined time (Step S203; YES), or, in other words, when a control program ID is received from the printer 10 within the predetermined time from the sending of the ID output request, it is judged whether the received control program ID coincides with the control program ID included in the control program data delivered to the printer monitoring program 22a (Step S204).

When both IDs coincide (Step S204; YES), or, in other words, when the control program 23 for the print data to be sent (the print data delivered from the printer driver 21a to the printer monitoring program 22a) already exists within the printer 10 (this case corresponds to a state where the printer 10 does not require supply of the control program), then, a second class print request including only the above-mentioned print data is sent to the printer 10 (Step S205). On the other hand, when both IDs do not coincide (Step S204; NO), then, the first class print request is sent (Step S206).

As described above, the printer driver 21a, which is installed as an element of the printer control software 20a onto the host computer 50, is a program that makes the host computer 50 generate print data and control program data including a control program 23 for processing the print data. Further, the printer monitoring program 22a is a program that makes the host computer 50 send an ID output request to verify whether the printer 10 stores therein the control program 23 capable of processing the print data to be sent (print data generated by the host computer 50 according to the printer driver 21a), and, when it is verified, makes the host computer 50 send a second class print request that does not include control program data (but includes only the print data), and otherwise, makes the host computer 50 send a first class print request that includes control program data and the print data. Further, the printer 10 is one that can answer an ID output request, a first class print request, and a second class print request.

The present printing system, which comprises thus-described host computer 50 and printer 10, is not operated in such a way that a language of print data is always different from a language of the preceding print data, at each printing. Thus, the present printing system functions as a printing system having a shorter average printing time than the conventional printing system in which a print request always includes a control program, to the extent that, in the present printing system, sometimes transfer of a control program 23 from the host computer 50 to the printer 10 is omitted.

(Second Embodiment)

Now, a configuration and operation of a printing system according to a second embodiment of the present invention will be described.

Figure 6:
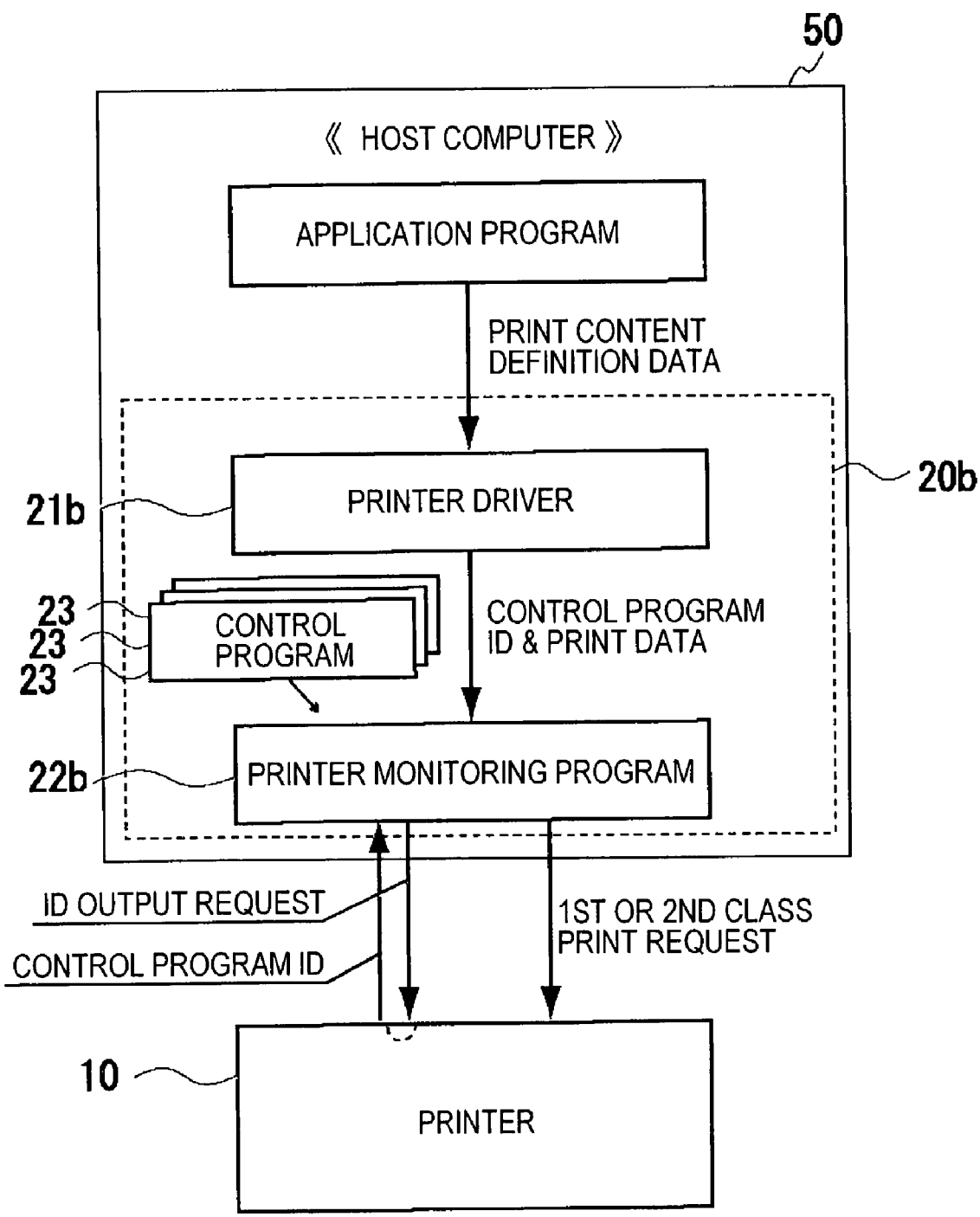
FIG. 6 is a diagram for explaining functions of printer control software that is installed on a host computer as a component of a printing system according to a second embodiment of the present invention.

As shown in FIG. 6, the printing system according to the second embodiment comprises a printer 10 and a host computer 50 on which printer control software 20b is installed. The printer 10 included in this printing system is entirely same as the printer 10 included in the printing system according to the first embodiment.

On the other hand, although the printer control software 20b, which is installed on the host computer 50 as a component of the printing system according to the second embodiment, is same as the printer control software 20a in that the printer control software 20b includes several control programs 23 to supply to the printer 10 and those control programs 23 are added with respective unique control program IDs, the printer control software 20b includes a printer driver 21b different from the printer driver 21a and a printer monitoring program 22b different from the printer monitoring program 22a.

The printer driver 21b included in the printer control software 20b is a program that generates print data of a designated language, and delivers the generated print data and a control program ID of a control program 23 required for processing the generated print data to the printer monitoring program 22b, wherein the print data is generated based on print content definition data that are given from an application program and define a content to be printed. In other words, the printer driver 21b is varied from the printer driver 21a in that the printer driver 21b outputs not control program data but a control program ID.

Figure 7:
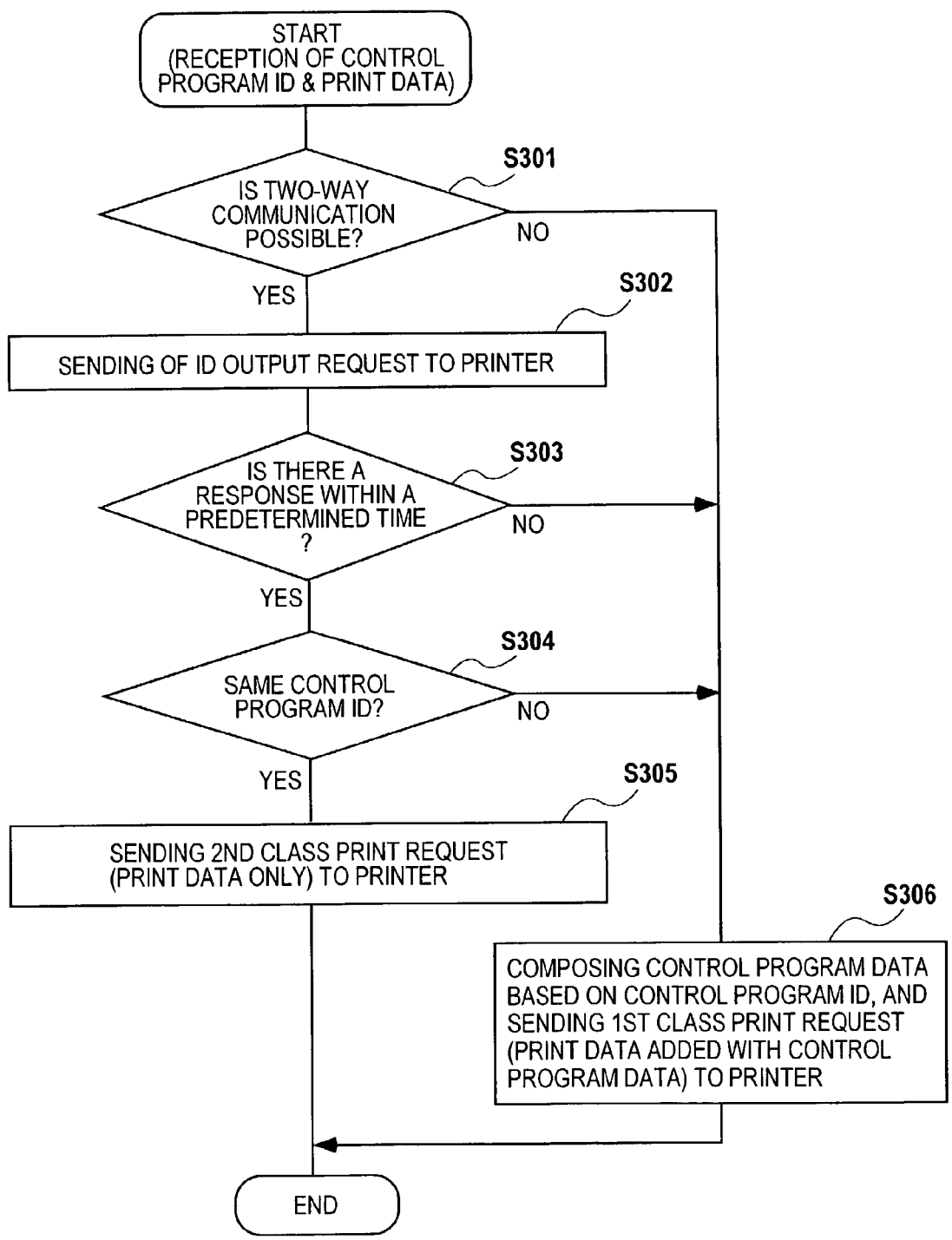
FIG. 7 is a flowchart showing processing executed in the host computer as a component of the printing system according to the second embodiment, under control of a printer monitoring program installed as an element of the printer control software.

On the other hand, the printer monitoring program 22b is a program that makes the host computer 50 performs the processing of the procedure shown in FIG. 7 when print data and a control program ID are received from the printer driver 21b.

Namely, in the host computer 50 in which print data and a control program ID are delivered to the printer monitoring program 22b, first it is judged whether the host computer 50 and the printer 10 are connected in such a form that two-way communication is possible between them (Step S301). When the host computer 50 and the printer 10 are not connected in such a form that two-way communication is possible between them (Step S301; NO), then, control program data are composed based on the control program ID (hereinafter, referred to as a processing object control program ID) delivered from the printer driver 21b to the printer monitoring program 22b, a first class print request is generated by adding the control program data to the print data (hereinafter, referred to as processing object print data) delivered from the printer driver 21b to the printer monitoring program 22b, and the generated first class print request is sent to the printer 10 (Step S306).

On the other hand, when the host computer 50 and the printer 10 are connected in such a form that two-way communication is possible between them (Step S301; YES), then, an ID output request is sent to the printer 10 (Step S302). When there is no answer to the ID output request within a predetermined time (Step S303; YES), then, the processing of Step S306 is performed to send the first class print request to the printer 10.

On the other hand, when a control program ID is sent from the printer within the predetermined time (Step S303; YES), then, it is judged whether the received control program ID coincides with the processing object control program ID (Step S304). When both IDs coincide (Step S304; YES), then, a second class print request including only the processing object print data is sent to the printer 10 (Step S305). On the other hand, when both IDs do not coincide (Step S304; NO), then, the first class print request is generated and sent in Step S306.

As described above, the printer driver 21b, which is installed as an element of the printer control software 20b onto the host computer 50, is a program that makes the host computer 50 generate print data and specify the control program ID of the control program 23 for processing the print data. Further, the printer monitoring program 22b is a program that makes the host computer 50 send a second class print request that does not include control program data (but includes only the print data) when it is verified that the control program 23 capable of processing the print data (print data generated by the host computer 50 according to the printer driver 21b) to be sent to the printer 10 is stored within the printer 10, and otherwise, makes the host computer 50 generate and send a first class print request that includes the print data added with the control program data required for controlling the print data.

The present printing system is not operated in such a way that a language of print data is always different from a language of the preceding print data, at each printing. Thus, similarly to the printing system of the first embodiment, the present printing system functions as a printing system having a shorter average printing time than the conventional printing system in which a print request always includes a control program, to the extent that, in the present printing system, sometimes sending of a control program 23 is omitted.

Further, the printing system according to the first embodiment is a printing system in which, sometimes, processing of converting a generated first class print request to a second class print request is performed within the host computer 50, or in other words, a printing system in which, sometimes, slightly ineffective processing is performed within the host computer 50. On the other hand, the printing system of the second embodiment functions as a system in which such an ineffective processing is not performed.

(Variations)

The printing systems according to the first and second embodiments can be variously changed. For example, it is not necessary the print control software 20x (x=a, b) includes the printer driver 21x and the printer monitoring program 22x, but the print control software 20x may include a program having the functions of those programs. Or, as the printer driver 21b, a printer driver (an ordinary printer driver) that delivers only print data to the printer monitoring program 22b may be employed, while the printer monitoring program 22b is given with an function of identifying a control program 23 required for processing print data delivered from the printer driver 21b, based on the print data.

(Third Embodiment)

Now, will be described a configuration and operation of a printing system according to a third embodiment of the present invention. In the present embodiment, the present invention is applied to a printing system realized on a computer network.

Figure 8:
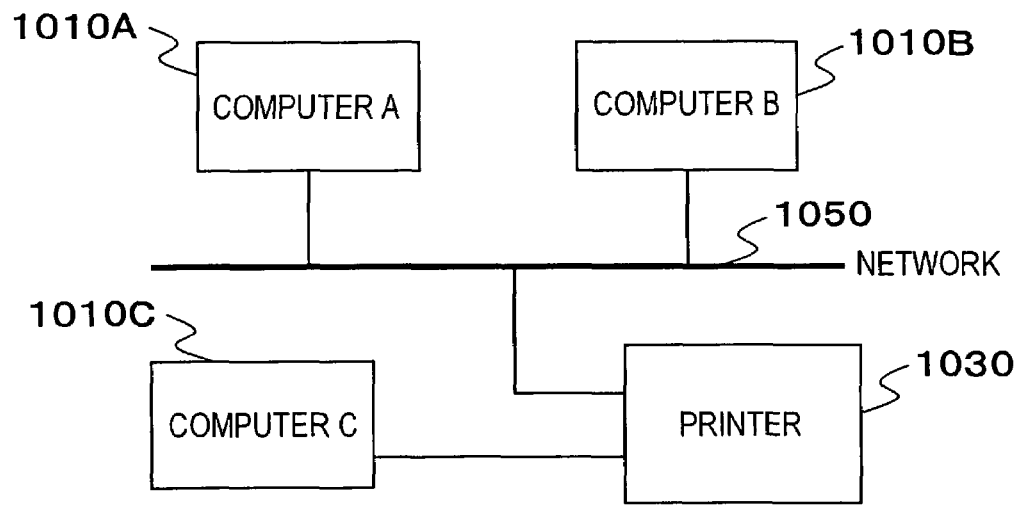
FIG. 8 is a block diagram for explaining an example of a configuration of a printing system according to a third embodiment.

FIG. 8 is a block diagram for explaining an example of a configuration of the printing system according to the present embodiment. In the printing system shown in the figure, computers 1010A, 1010B (which perform various processes by applications, printing processes by a printer driver, etc.) and a printer 1030 are connected through a network 1050. Further, the printer 1030 is locally connected with a computer 1010C. The network 1050 may be a LAN (Local Area Network) utilizing Ethernet, for example. However, the configuration of the printing system is not limited to this. For example, the computers 1010 and the printer 1030 may be connected through parallel interface, USB, or the like.

Figure 9:
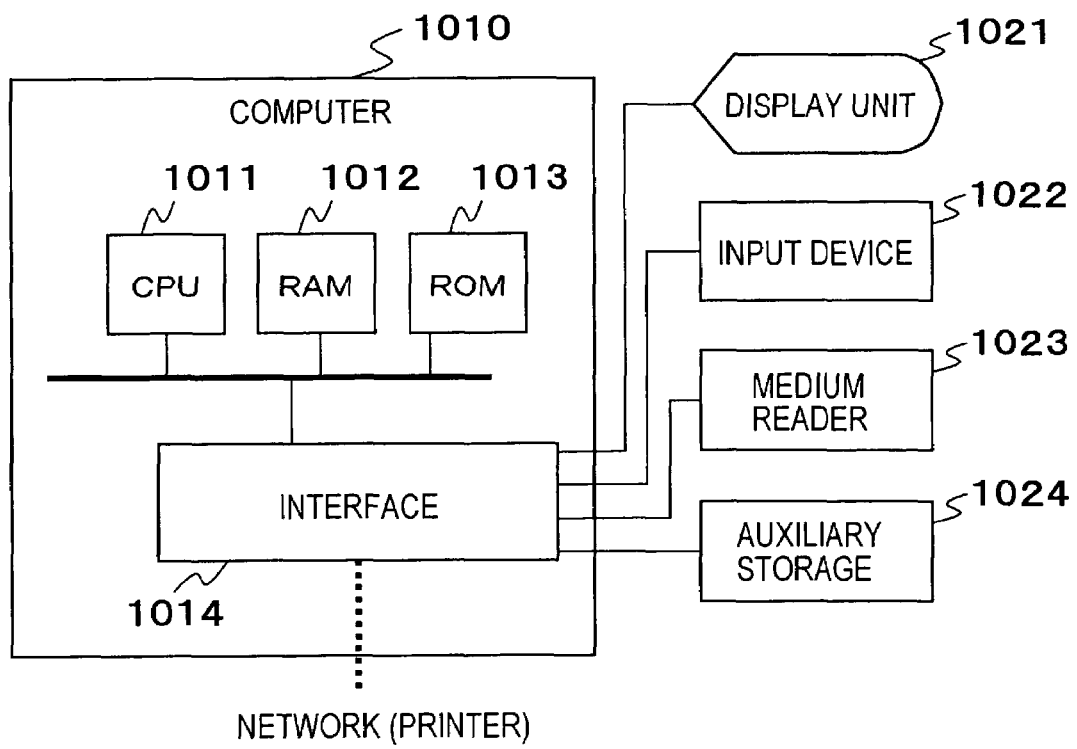
FIG. 9 is a block diagram for explaining an example of a hardware configuration of a computer according to the third embodiment.

FIG. 9 is a block diagram for explaining an example of a hardware configuration of each computer 1010. As shown in the figure, the computer 1010 comprises: a CPU (Central Processing Unit) 1011 for controlling the computer 1010 by executing various programs; a RAM (Random Access Memory) 1012 for temporally storing data, programs, etc.; a ROM (Read Only Memory) 1013 for storing various data, various programs, etc. in advance in a nonvolatile manner, for controlling the computer 1010; and an interface 1014 in charge of transmission and reception of data to and from connected peripherals such as the printer 1030.

Further, to the computer 1010, are connected a display unit 1021 such as a color display, an input device 1022 such as a mouse or keyboard, a medium reader 1023 for reading data from a storage medium such as a CD-ROM, and an internal or external auxiliary storage 1024. Of course, the configuration of the computer 1010 is not limited to this.

Figure 10:
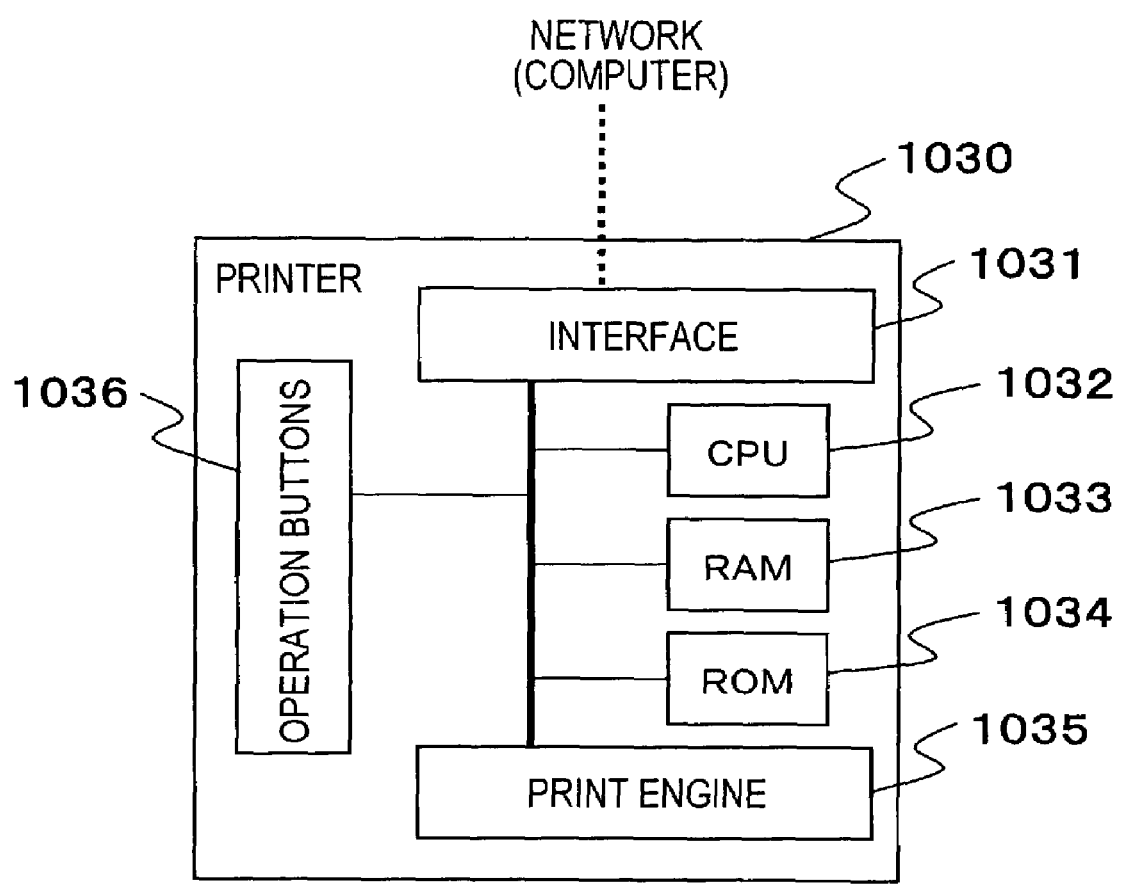
FIG. 10 is a block diagram for explaining an example of a hardware configuration of a printer according to the third embodiment.

FIG. 10 is a block diagram for explaining an example of a hardware configuration of the printer 1030. The printer 1030 is, for example, a laser page printer, although not limited to it. For example, an ink jet color printer may be employed. The printer 1030 receives print data from any one of the computers 1010A–1010C, and performs printing based on the received print data.

There are several formats for print data sent from a computer 1010 to the printer 1030, and printing processing in the printer 1030 is different depending on the format of received print data. For example, when a control language, which consists of a predetermined group of commands, is sent as print data, the printer 1030 interprets the control language to develop it into image data as an aggregate of dots, and performs printing. Generally, specifications for a control language are different for each printer. Further, when image data are sent as print data, the printer 1030 uses the image data to perform printing. Although the present invention can be applied to any format, the case where a control language is sent as print data is taken as an example in the following description.

The printer 1030 comprises: an interface 1031 in charge of transmission and reception of data to and from the computer 1010A or 1010B connected through the network 1050 or the computer 1010C connected locally; a CPU 1032 for executing various programs; a RAM 33 for temporarily storing print data, a program for controlling the printer 1030, etc.; a ROM 1034 for storing programs for communication control, initialization of the printer, etc. in advance in a volatile manner; a print engine 1035 including a laser-irradiation mechanism, a photoconductor drum mechanism, a toner supply mechanism, a paper feed mechanism, a paper supplying and ejecting mechanism for performing processing of supplying and ejecting a printing medium, and the like; and operation buttons 1036 for receiving instructions from a user. Of course, the configuration of the printer 1030 is not limited to this.

Figure 12:
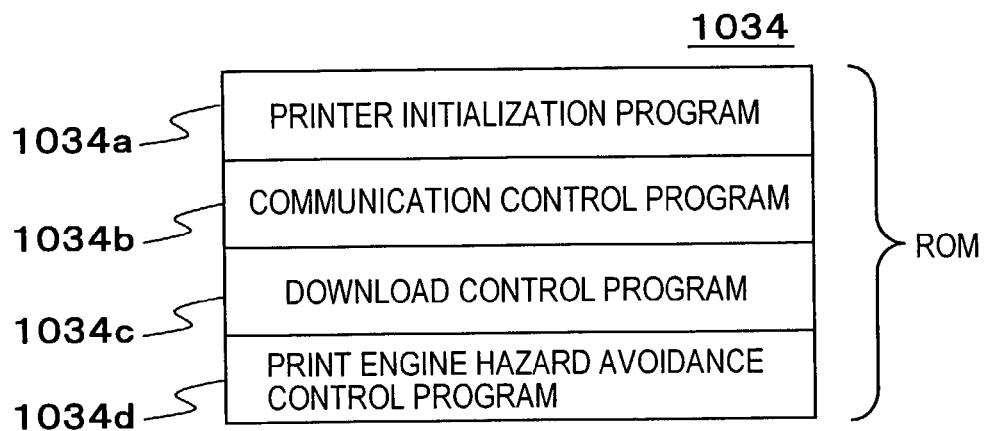
FIG. 12 is a schematic diagram for explaining an example of programs stored in a ROM in the third embodiment.

FIG. 12 is a schematic diagram for explaining an example of programs stored in the ROM 1034. In the figure, the ROM 1034 stores a printer initialization program 1034a, a communication control program 1034b, a download control program 1034c, and a print engine hazard avoidance control program 1034d.

The printer initialization program 1034a is a program for initializing the printer 1030 at the time of power-on or the like, to put the printer 1030 in a stable state. The communication control program 1034b is a program for communication with a computer connected to the network or connected locally. The download control program 1034c is a program for processing below-mentioned download of a program from a computer 1010. The print engine hazard avoidance control program 1034d is a program for controlling, for example, operation of avoiding breakage of the print engine 1035 when abnormality arises in the course of printing or the like.

Thus, in the present embodiment, the ROM 1034 stores only part of all the programs required for operation of the printer 1030, in particular, only the necessity minimum for performing communication control, download control, initialization, and hazard avoidance. Accordingly, it is possible to make the capacity of the ROM 1034 small. It is desirable to store these programs always within the printer 1030 from the viewpoint of urgency, safety, etc., and it is not appropriate to download these programs from the computer 10 out of necessity.

When there is room in the capacity of the ROM 1034, part of modules of the program for controlling the printer, or a program for interpretation of language may be stored, for example.

Figure 13:
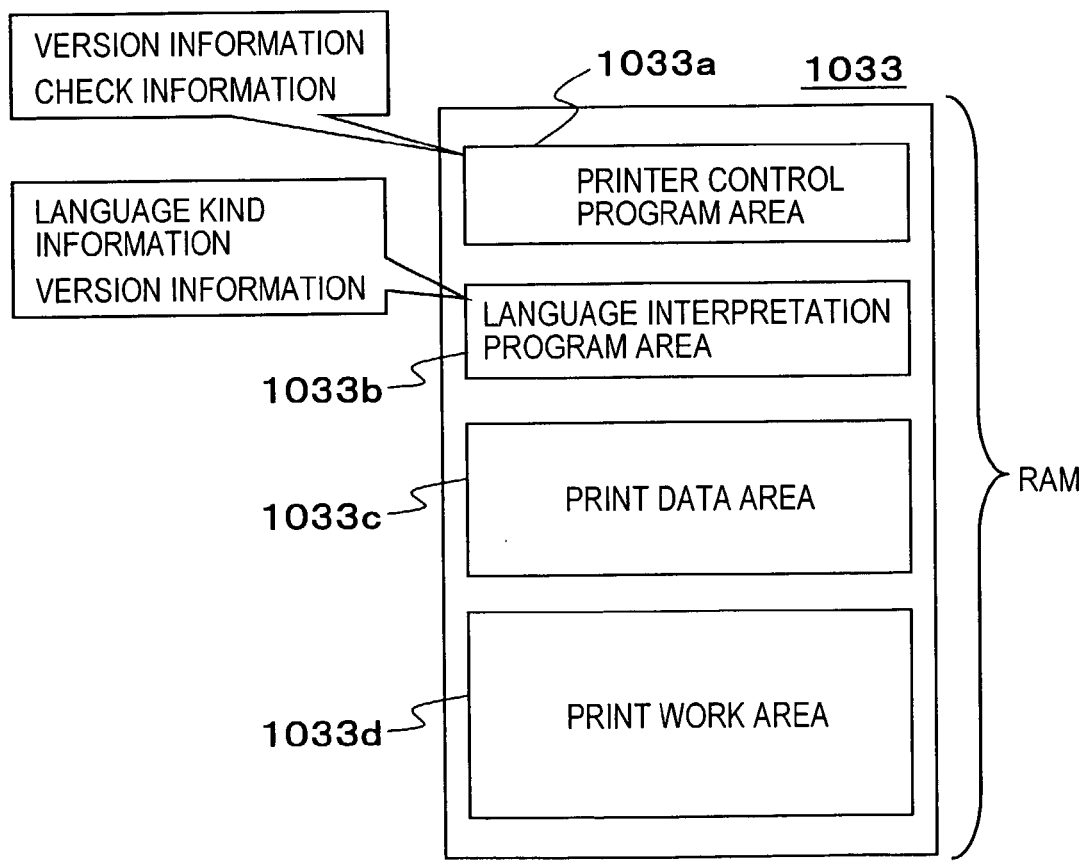
FIG. 13 is a schematic diagram for conceptually explaining storage areas established on a RAM at the time of performing printing in the third embodiment.

FIG. 13 is a schematic diagram for conceptually explaining storage areas established on the RAM 1033. As shown in the figure, a printer control program area 1033a, a language interpretation program area 1033b, a print data area 1033c, and a print work area 1033d are established on the RAM 1033.

The printer control program area 1033a is an area storing a program for controlling printing processing of the printer. This program is downloaded from a computer 1010, previous to print data, and stored into the area 1033a in question. The printer control program area 1033a contains information indicating a version of the printer control program and information for checking whether the printer control program is normal.

The language interpretation program area 1033b is an area storing a program for interpreting a control language sent as print data from a computer. This program is downloaded from the computer 1010, previous to print data, and stored into the area 1033b in question. The language interpretation program area 1033b contains information indicating a kind of language that the language interpretation program can deal with, and information indicating a version of the language interpretation program.

The print data area 1033c is an area storing print data sent from the computer 1010.

The print work area 1033d is an area used for work for developing the print data into image data, and work for other processing.

Thus, in the present embodiment, the program for controlling printing processing of the printer and the program for interpreting a control language are download from a computer 1010 and stored into the RAM 1033. Thus, it is not necessary to store these programs in the ROM 1034. These programs can meet the requirements, if they exist in the printer 1030 when printing is performed.

Figure 11:
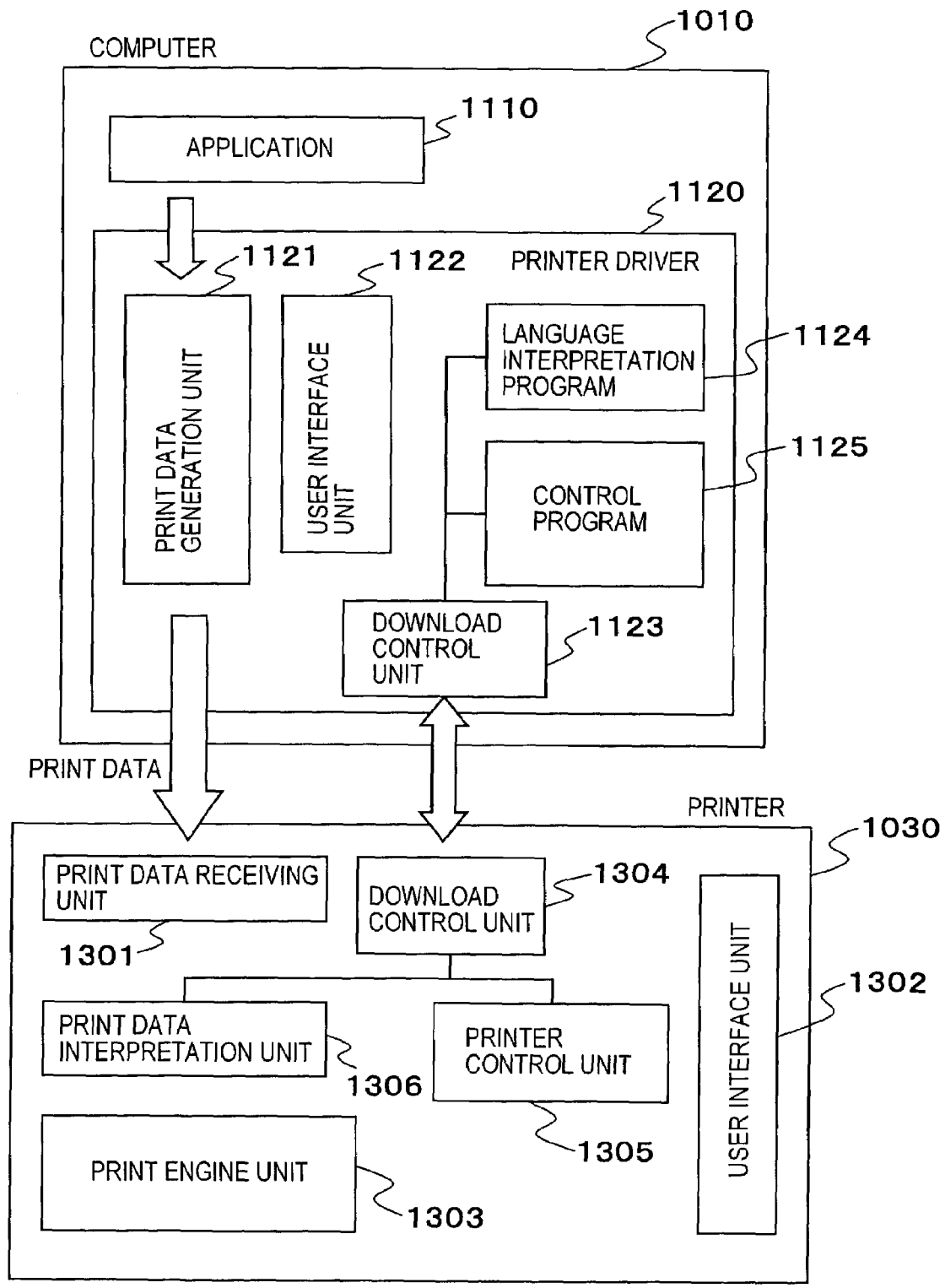
FIG. 11 is a block diagram for explaining a main part of functional configurations implemented by the computer and the printer according to the third embodiment.

Next, referring to the block diagram of FIG. 11, will be described a main part of functional configurations implemented by a computer 1010 and the printer 1030. In FIG. 11, the computers 1010 are represented by one computer.

First, a functional configuration implemented on the computer 1010 will be described.

As shown in the figure, an application 1110 and a printer driver 1120 are established on the computer 1010. These functional parts are established on the computer 1010 when the CPU 1011 executes programs read into the RAM 1012. A program for this purpose can be marketed, for example, by storing it on a portable storage medium such as a CD-ROM. When the medium reader 1023 reads such a storage medium, the program can be installed on the computer 1010. Or, the program may be installed through a computer network such as Internet.

The application 1110 makes the computer 1010 execute predetermined processing such as graphic processing or word processing, for example. The application 1110 has such a function that, when, for example, the application 1110 receives a print instruction from a user, then, the application 1110 calls the below-described user interface unit 1122 of the printer driver 1120, to receive a print setting from the user, and sends image data of document under processing to the printer driver 1120.

The printer driver 1120 receives the image data, and makes the computer 1010 perform processing of converting the image data into print data that can be interpreted by the printer 1030, processing of outputting the converted data, and other processing. The printer driver 1120 comprises: a print data generation unit 1121; the user interface unit 1122; and a download control unit 1123. The download control unit 1123 can refer to a language interpretation program 1124 and a control program 1125 to download into the printer 1030. The language interpretation program 1124 and the control program 1125 can be stored in the auxiliary storage 1024, for example.

The print data generation unit 1121 receives image data from the application 1110, generates print data made by a predetermined control language, based on the image data, and sends the generated print data. Here, the image data may be received through an operating system that controls the computer 1010, for example.

Figure 18:
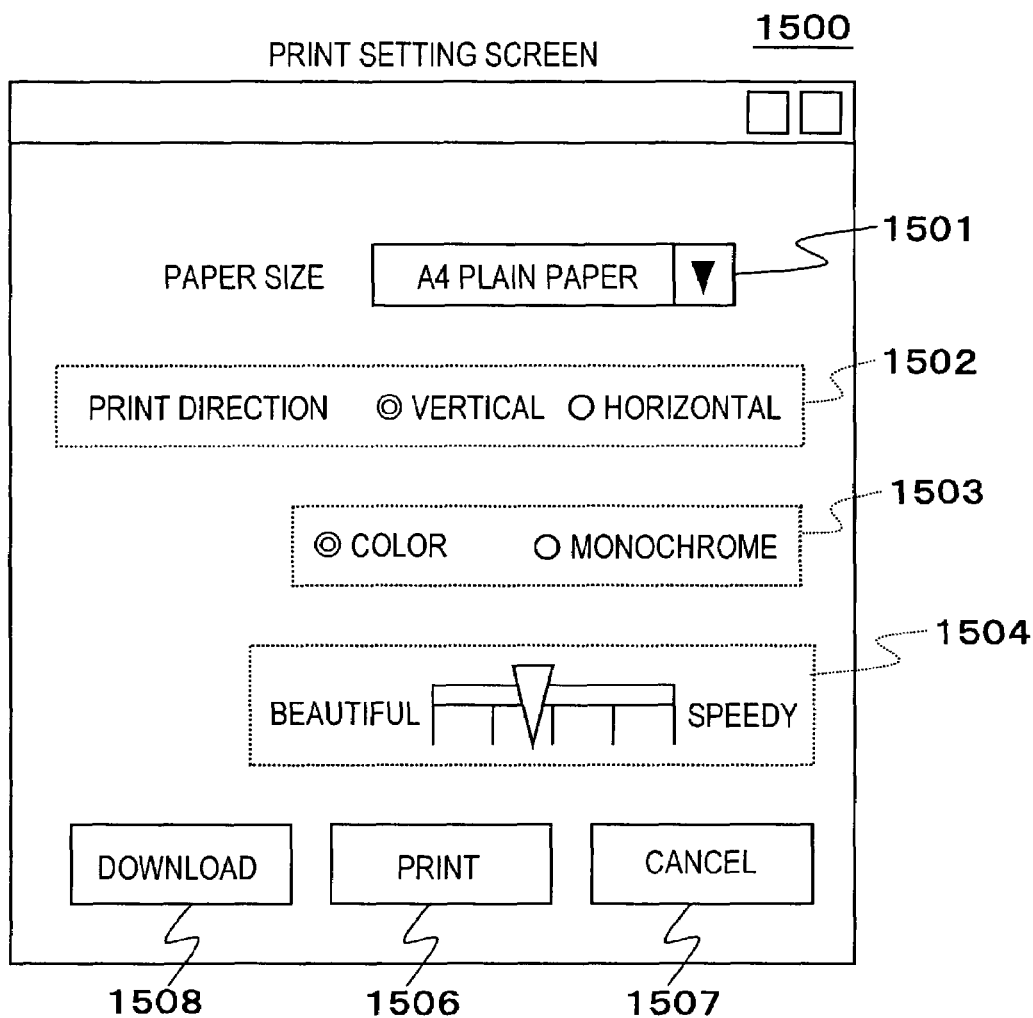
FIG. 18 is a view for explaining an example of a print setting screen in the third embodiment.

When the user interface unit 1122 is called, for example, from the application 1110 that has received a print instruction from a user, then, the user interface unit 1122 makes the display unit 1021 display a print setting screen 1500 for example as shown in FIG. 18, to prompt the user to determine print setting. The print setting screen 1500 is a screen for receiving setting of various conditions for the printer 1030 to perform printing. In the shown example, a paper size 1501, a print direction 1502, a color print specification 1503, and a resolution specification 1504 can be specified as setting items.

The user can print an object document by setting the print conditions in this screen 1500 and clicking a print button 1506. Namely, when a click of the print button 1506 is received, the user interface unit 1122 makes the application 1110 output image data of the document under processing. Then, the print data generation unit 1121 generates print data based on the image data, and outputs the generated print data to the printer 1030. Prior to the output of the print data, the download control unit 1123 communicates with the printer 1030, to download required programs to the printer. This operation will be described later.

Further, when the user clicks a download button 1508 in the present screen 1500, it is possible to download the required programs to the printer 1030 without sending the print data. Namely, when a click of the download button 1508 is received, the user interface unit 1122 makes the download control unit 1123 communicate with the printer 1030 to download the required programs to the printer. This operation also will be described later.

The download control unit 1123 communicates with a download control unit 1304 of the printer 1030, and, in case of necessity, controls download of the language interpretation program 1124 and the printer control program 1125 to the printer 1030.

The language interpretation program 1124 is a program that is executed by the CPU 1032 of the printer 1030 in order to interpret a control language. For this purpose, the language interpretation program 1124 is downloaded to the printer 1030, in case of necessity. The language interpretation program 1124 holds information indicating a kind of control language capable of interpretation and version information of the language interpretation program, as the attribute of the program.

The printer control program 1125 is a program that is executed by the CPU 1032 of the printer 1030 in order to control printing processing of the printer. For this purpose, the printer control program 1125 is downloaded to the printer 1030, in case of necessity. The printer control program 1125 holds version information of the printer control program, as the attribute of the program. Further, the printer control program 1125 holds information (for example, checksum information) for checking whether the printer control program 1125 itself is normal. However, this information may be omitted.

Next, a functional configuration implemented on the printer 1030 will be described.

As shown in FIG. 11, a print data receiving unit 1301, a user interface unit 1302, a print engine unit 1303, the download control unit 1304, a printer control unit 1305, and a print data interpretation unit 1306 are established on the printer 1030. The print data receiving unit 1301, the user interface unit 1302, the download control unit 1304 and part of the print engine unit 1303 are established on the printer 1030 when the CPU 1032 executes mainly the programs stored in advance in the ROM 1034. The printer control unit 1305 and the print data interpretation unit 1306 are established on the printer 1030 when the CPU 1032 executes mainly the programs downloaded into the RAM 1033.

The print data receiving unit 1301 receives print data sent from the computer 1010.

The user interface unit 1302 performs processing for receiving information, for example, for setting the printer 1030 through setting buttons or the like provided on a housing body of the printer 1030, and processing for displaying already-set information, guide information for setting, or the like on a liquid crystal panel or the like provided on the housing body of the printer 1030.

The print engine unit 1303 performs processing for controlling operation of the print engine 1035 at the time of printing, and processing for operation of avoiding breakage of the print engine 1035 when abnormality arises.

Figure 19:
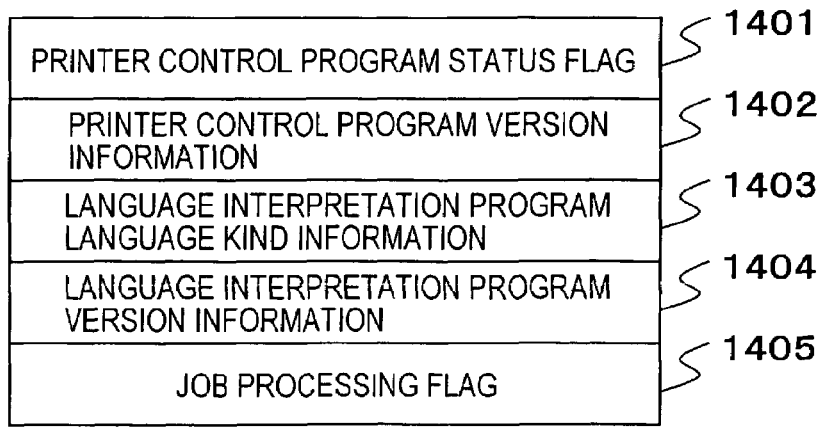
FIG. 19 is a diagram for explaining information that is set and managed by means of status information in the third embodiment.

The download control unit 1304 communicates with the download control unit 1123 of the computer 1010 to perform processing for downloading required programs. Further, the download control unit 1304 sets and manages status information, which is information regarding programs downloaded from the computer 1010 and stored in the RAM 1033. FIG. 19 is a diagram for explaining information that is set and managed by means of the status information. As shown in the figure, the download control unit 1304 sets and manages: a printer control program status flag 1401, which indicates the effectiveness of the printer control program; printer control program version information 1402; language interpretation program language kind information 1403; language interpretation program version information 1404; and a job processing flag 1405, which indicates whether the printer 1030 is processing a job.

Further, the download control unit 1304 returns a device ID of the printer 1030, in response to a device ID enquiry from the computer 1010. Here, the device ID is information for specifying the model of the printer 1030.

The printer control unit 1305 controls printing processes of the printer 1030.

The print data interpretation unit 1306 interprets print data received from the computer 1010, and performs processing for developing the print data into image data.

Next, operation of the printer system in the present embodiment will be described.

Figure 14:
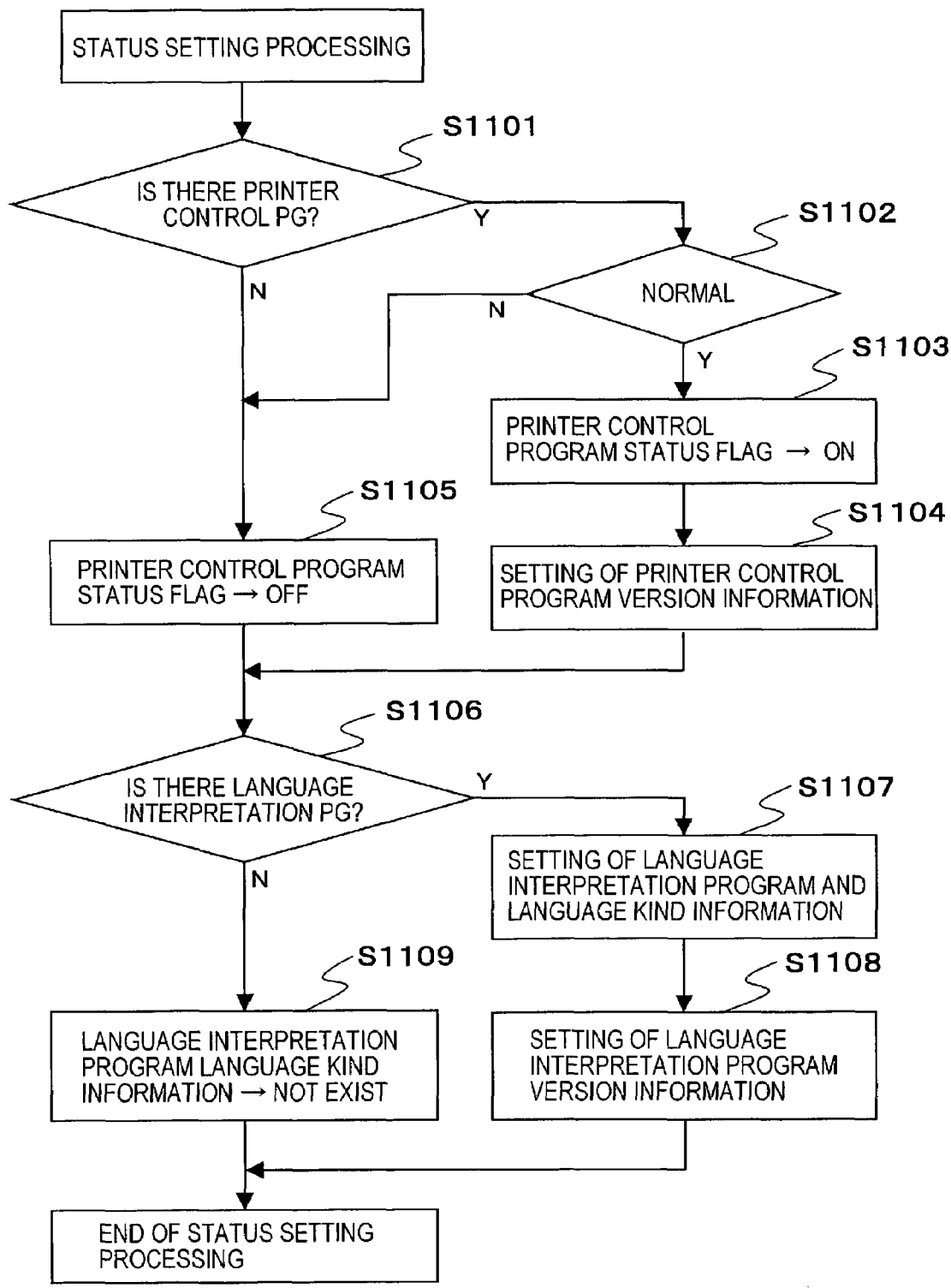
FIG. 14 is a flowchart for explaining processing by a download control unit for setting up status information in the third embodiment.

First, referring to the flowchart of FIG. 14, will be described processing by the download control unit 1304 for setting the status information.

The status setting processing may be performed when the printer 1030 is powered on and a status acquisition request from the computer 1010 is received, for example.

First, the download control unit 1304 examines whether the RAM 1033 stores the printer control program (S1101). As a result, when the program is stored, the check information of the printer control program is used to examine whether the printer control program is normal (S1102). When the program is normal, the printer control program status flag 1401 of the status information is set (S1103). Further, the version information of the stored printer control program is acquired and recorded into the printer control program version information 1402 of the status information.

On the other hand, when the RAM 1033 does not store the printer control program, or the program is stored but not normal, then, the printer control program status flag of the status information is cleared (S1105).

Next, the download control unit 1304 examines whether the RAM 1033 stores a language interpretation program (S1106). As a result, when a language interpretation program is stored, language kind information of the language interpretation program stored is acquired, and recorded into the language interpretation program language kind information 1403 of the status information (S1107). Further, the version information of the language interpretation program stored is acquired and recorded into the language interpretation program version information 1404 of the status information (S1108).

On the other hand, when the RAM 1033 does not store a language interpretation program, then, information to the effect that "there is no language interpretation program stored" is recorded into the language interpretation program kind information 1403 of the status information.

Thus, the status information setting processing is finished. The present example has been described assuming that only one kind of language interpretation program is stored in the RAM 1033. However, the present invention is not limited to this, and several kinds of language interpretation programs may be stored in the RAM 1033 at the same time. In that case, the language interpretation program language kind information 1403 and the language interpretation program version information 1404 in the status information are adjusted in order to record pieces of information.

Further, the job processing flag 1405 in the status information is suitably set based on information sent from the computer 1010.

Figure 15:
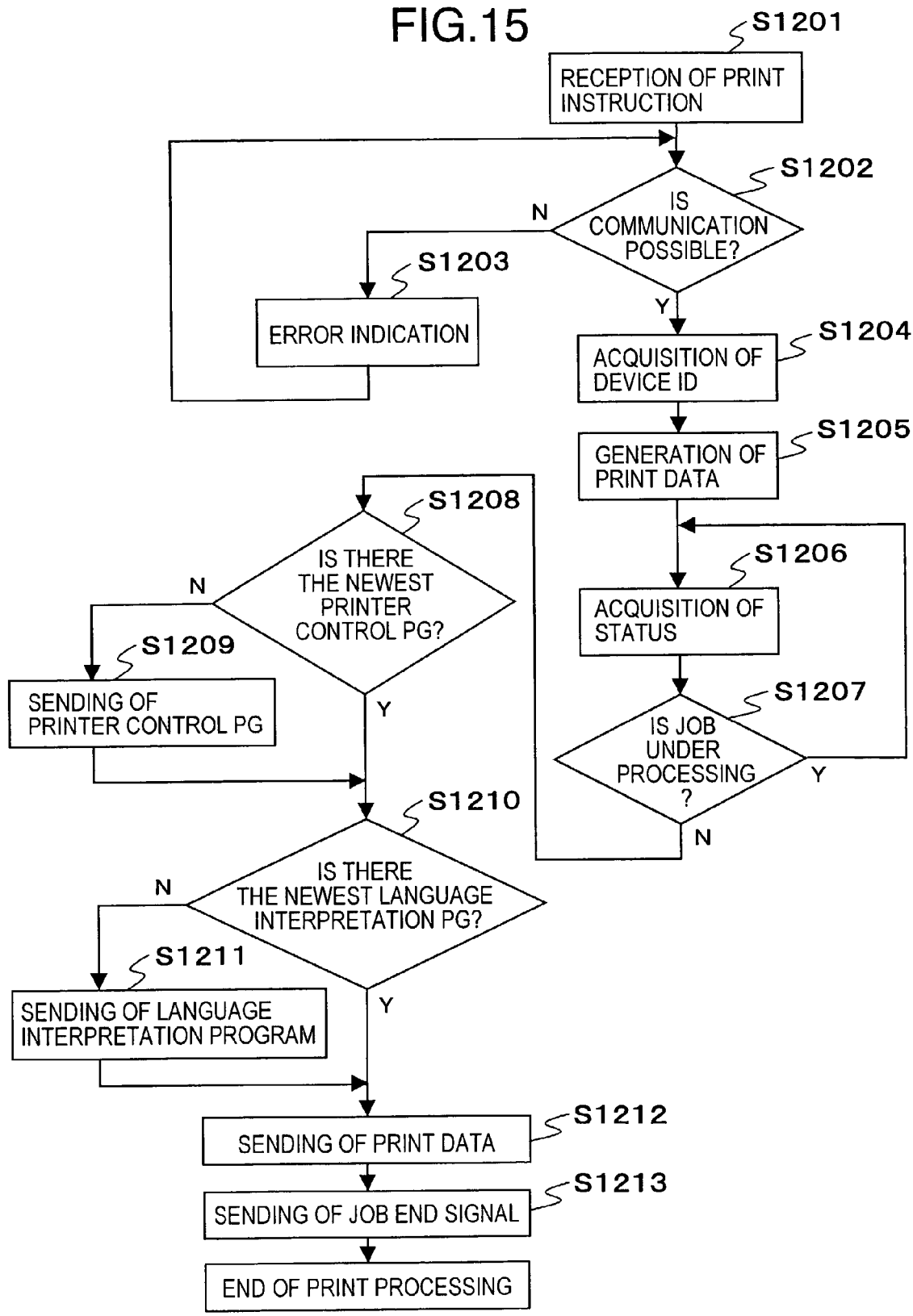
FIG. 15 is a flowchart for explaining processing in the case where a printer driver receives a print instruction from a user, in the third embodiment.

Next, referring to the flowchart of FIG. 15, will be described processing in the case where the printer driver 1120 of the computer 1010 receives a print instruction from a user. This is the processing started when a click of the print button 1506 is received through the print setting screen 1500 shown in FIG. 18.

When the download control unit 1123 receives a print instruction through the user interface unit 1122 (S1201), the download control unit 1123 examines whether communication is established with the printer 1030 (S1102). As a result, when communication is impossible owing to, for example, power-off of the printer 1030, then, error processing is performed, for example, by displaying error indication on the display unit 1021 (S1203).

When the communication is established with the printer 1030, then, inquiry is made about a device ID of the printer 1030 to the download control unit 1304 of the printer 1030, to acquire the device ID (S1204). This processing is required when a printer control program etc. to be downloaded are changed depending on the model of the printer 1030. When the model of the printer is specified in advance, or when the programs to be downloaded are not changed depending on the model, then, the above processing can be omitted.

Further, the print data generation unit 1121 acquires image data of the printing object from the application 1110, and generates print data based on the image data (S1205). This operation may be performed in parallel with other operation.

The download control unit 1123 makes a request to the download control unit 1304 of the printer 1030 for the status information, to acquire the status information of the printer 1030 (S1206). Then, it is examined whether the job processing flag 1405 of the acquired status information is on (S1207).

As a result, when the job processing flag 1405 is on, then, it is judged that the printer 1030 is in the course of printing processing for another computer, and the status acquiring processing (S1206) is repeated until the job processing flag 1405 becomes off. By this, the present invention can be applied to the printing system in which a plurality of computers are connected to the printer through the network or locally, without mixing pieces of information from the respective computers.

When, as a result of the above processing (S1207) examining whether the job processing flag 1405 is on or not, the job processing flag 1405 is on, then, it is examined whether the printer 1030 stores a printer control program, referring to the printer control program status flag 1401 of the status information. When the printer control program status flag 1401 is on, indicating that a printer control program is stored, then, it is further examined whether the version of the printer control program stored is same as the version of the printer control program 1125 of the computer 1010, referring to the printer control program version information 1402 (S1208). Here, in the case where the printer control program is changed for each printer model, the device ID is referred to, in order to compare it with the printer control program 1125 corresponding to the printer 1030.

As a result, when the printer 1030 does not store a printer control program, or when the version of the stored printer control program is not equal to the version of the printer control program 1125 of the computer 1010, then, the printer control program 1125 is sent to the download control unit 1304 of the printer 1030 (S1209).

Thus, according to the present embodiment, the printer control program 1125 is downloaded, only when it is necessary, and overhead at printing can be reduced.

Next, referring to the language interpretation program language kind information of the status information, it is examined whether the printer 1030 stores the language interpretation program for interpreting the control language relating to the printing concerned. When the printer 1030 stores the language interpretation program for interpreting the control language relating to the printing concerned, then, it is further examined whether the version of the stored program is same as the version of the language interpretation program 1124 of the computer 1010, referring to the language interpretation program version information 1404 (S1210).

As a result, when the printer 1030 does not store the language interpretation program, or when the version of the stored program does not equal to the version of the language interpretation program 1124 of the computer 1010, then, the language interpretation program 1124 is sent to the download control unit 1304 of the printer 1030 (S1211).

Thus, according to the present embodiment, the language interpretation program is downloaded, only when it is necessary, and overhead at printing can be reduced.

Thereafter, the print data generated by the print data generation unit 1121 are sent to the print data receiving unit 1301 of the printer 1030 (S1212).

When sending (S1212) of the print data is finished, a job end signal, which indicates an end of the job, is sent to the download control unit 1304 of the printer (S1213), to end the printing.

Figure 16:
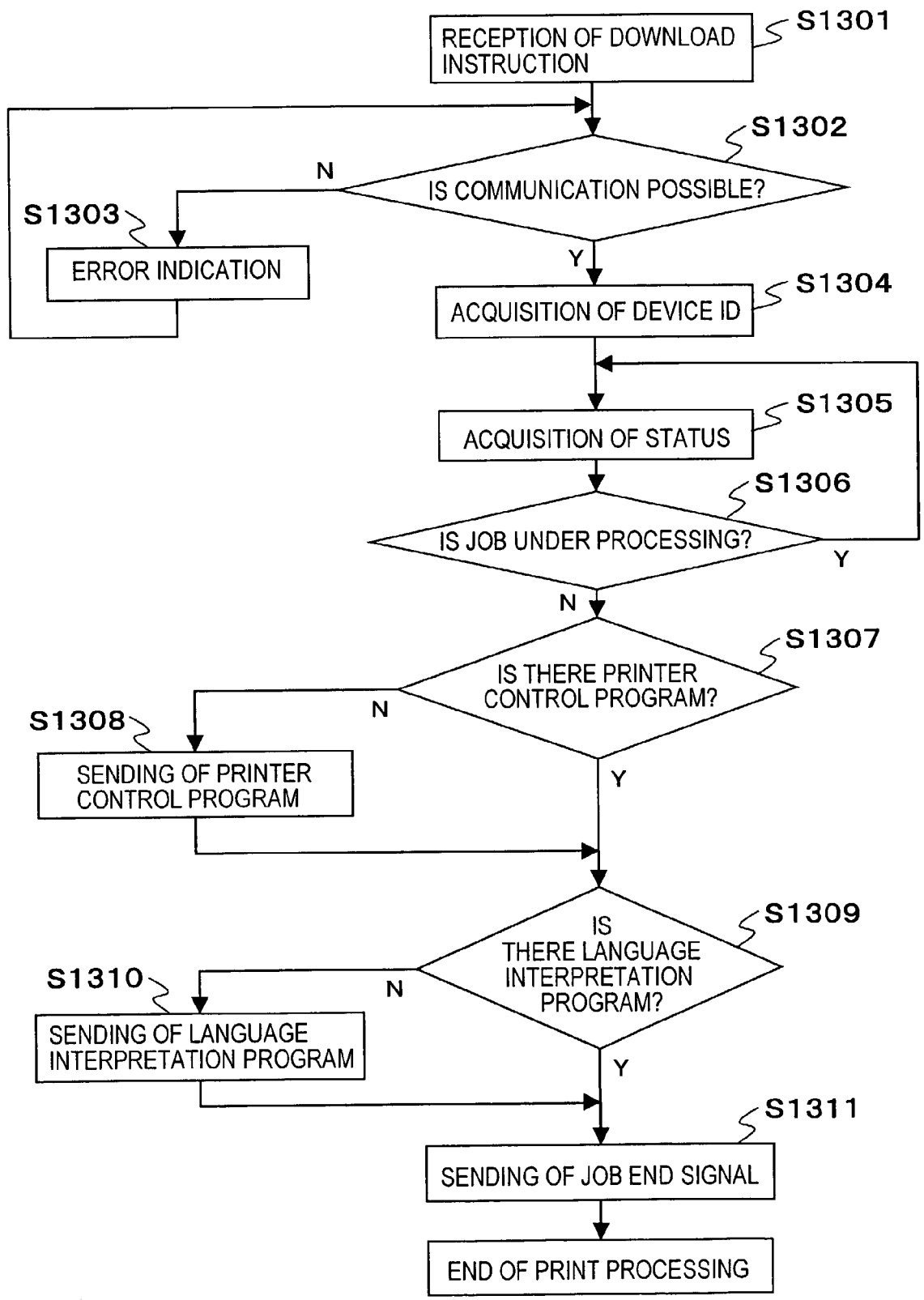
FIG. 16 is a flowchart for explaining processing in the case where the printer driver receives a download instruction from a user, in the third embodiment.

Next, referring to the flowchart of FIG. 16, will be described processing in the case where the printer driver 1120 of the computer 1010 receives a download instruction from a user. This is the processing started when a click of the download button 1508 is received through the print setting screen 1500 shown in FIG. 18.

When a download instruction is received through the user interface unit 1122 (S1301), then, the download control unit 1123 examines whether communication is established with the printer 1030 (S1302). As a result, when communication is impossible owing to, for example, power-off of the printer 1030, then, the error processing is performed, for example, by displaying the error indication on the display unit 1021 (S1303).

When the communication is established with the printer 1030, then, inquiry is made about a device ID of the printer 1030 to the download control unit 1304 of the printer 1030, to acquire the device ID (S1304). This processing is required when a printer control program etc. to be downloaded are changed depending on the model of the printer 1030. When the model of the printer is specified in advance, or when the programs to be downloaded are not changed depending on the model, then, the above processing can be omitted.

Next, the download control unit 1123 makes a request to the download control unit 1304 of the printer 1030 for the status information, to acquire the status information of the printer 1030 (S1305). Then, it is examined whether the job processing flag 1405 of the acquired status information is on (S1306).

As a result, when the job processing flag 1405 is on, then, it is judged that the printer 1030 is in the course of printing processing for another computer, and the status acquiring processing (S1305) is repeated until the job processing flag 1405 becomes off.

When the job processing flag 1405 is off in the above processing (S1306), then, it is examined whether the printer 1030 stores a printer control program, referring to the printer control program status flag 1401 of the status information. When the printer control program status flag 1401 is on, indicating that a printer control program is stored, then, it is examined whether the version of the printer control program stored is same as the version of the printer control program 1125 of the computer 1010, referring to the printer control program version information 1402 (S1307). Here, in the case where the printer control program is changed for each printer model, the device ID is referred to, in order to compare it with the printer control program 1125 corresponding to the printer 1030.

As a result, when the printer 1030 does not store a printer control program, or when the version of the stored printer control program is not equal to the version of the printer control program 1125 of the computer 1010, then, the printer control program 1125 is sent to the download control unit 1304 of the printer 1030 (S1308).

Next, referring to the language interpretation program language kind information of the status information, it is examined whether the printer 1030 stores the language interpretation program for interpreting the control language relating to the printing performed in the printer 1030. When the printer 1030 stores the language interpretation program for interpreting the control language relating to the printing performed in the printer 1030, then, it is further examined whether the version of the stored program is same as the version of the language interpretation program 1124 of the computer 1010, referring to the language interpretation program version information 1404 (S1309).

As a result, when the printer 1030 does not store the language interpretation program, or when the version of the stored program does not equal to the version of the language interpretation program 1124 of the computer 1010, then, the language interpretation program 1124 is sent to the download control unit 1304 of the printer 1030 (S1310).

When the above processing is finished, a job end signal, which indicates an end of the job, is sent to the download control unit 1304 of the printer (S1311), to end the downloading.

Thus, according to the present embodiment, it is possible to download a printer control program or a language interpretation program without accompanying sending of print data. Accordingly, when these programs are downloaded in advance, it is possible to reduce overhead at printing.

Figure 17:
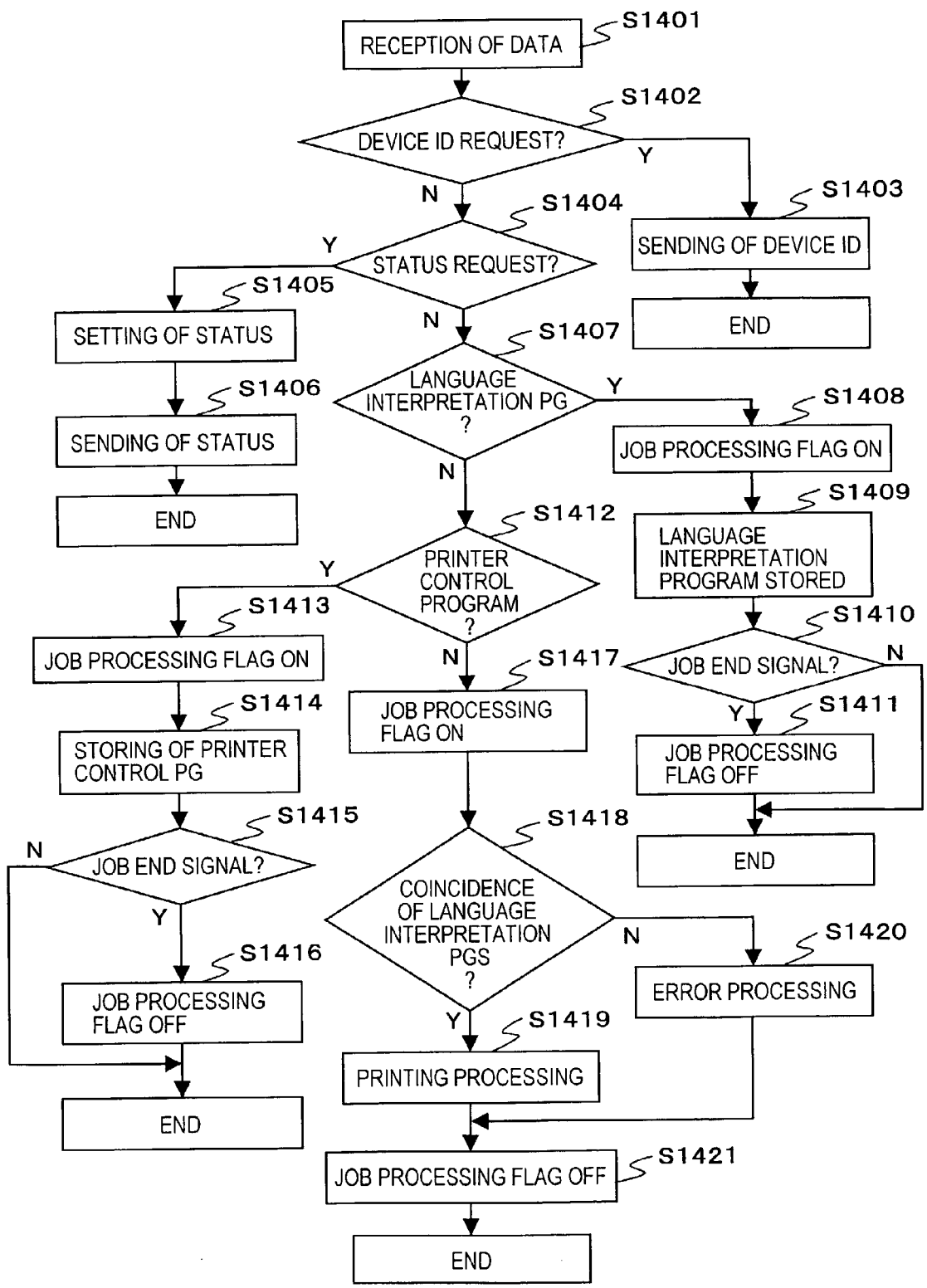
FIG. 17 is a flowchart for explaining processing by the printer that receives various data, in the third embodiment.

Next, referring to the flowchart of FIG. 17, will be described processing in the printer 1030 that received the above-mentioned various kinds of data from the computer 1010. Here, the below-mentioned order of judging each kind of data is an example, and can be arbitrarily changed.

When the printer 1030 receives data from the computer 1010 (S1401), the printer 1030 judges whether the data is a device ID request (S1402). As a result, when it is the device ID request, then, the download control unit 1304 sends the device ID to the download control unit 1123 of the computer (S1403), and the printer 1030 awaits reception of next data.

When the received data is not a device ID request, then, it is judged whether the data is a status request (S1404). As a result, when the data is a status request, then, the download control unit 1304 performs the above-described status setting processing (S1405). Then, the status information, which has been set, is sent to the download control unit 1123 of the computer 1010 (S1406), and the printer 1030 awaits reception of next data.

When the received data is not a status request, then, it is judged whether the data is a language interpretation program (S1407). As a result, when the data is a language interpretation program, then, the download control unit 1304 sets the job processing flag 1405 of the status information, not to receive processing from another computer 1010 (S1408). Then, the received language interpretation program is stored into the language interpretation program storage area 1033*b* of the RAM 1033 (S1409). In the case where a language interpretation program has been already stored in the RAM 1033 at that time, then, for example, it may be judged whether the program stored is same as the program sent. When both programs are same, then the received program may be thrown away. When reception of the language interpretation program is finished, then, it is judged whether the computer 1010 has sent a job end signal (S1410). As a result, when a job end signal has been sent, then, the job processing flag 1405 of the status information is cleared (S1411). Then, regardless of sending or non-sending of a job end signal, reception of next data is awaited. Here, in the step where the language interpretation program is received, the language interpretation program language kind information 1403 and the language interpretation program version information 1404 of the status information may be updated.

When the received data is not a language interpretation program, then, it is judged whether the data is a printer control program (S1412). As a result, when the data is a printer control program, then, the download control unit 1304 sets the job processing flag 1405 of the status information, not to receive processing from another computer (S1413). Then, the received printer control program is stored into the printer control program storage area 1033*a* of the RAM 1033 (S1414). When reception of the printer control program is finished, then, it is judged whether the computer 1010 has sent a job end signal (S1415). As a result, when a job end signal has been sent, then, the job processing flag 1405 of the status information is cleared (S1416). Then, regardless of sending or non-sending of a job end signal, reception of next data is awaited. Here, when the reception of the printer control program is finished, then, it may be judged if the program has been received normally or not, to perform error processing or re-sending requesting processing in the case of failure of the reception. Further, in the step where the printer control program is received, the printer control program status flag 1401 and the printer control program version information 1402 of the status information may be updated.

When the received data is not a printer control program, the printer 1030 judges that the received data is print data. Then, the download control unit 1304 sets the job processing flag 1405 of the status information, not to receive processing from another computer (S1417). Here, when the job processing flag 1405 has been on already, then, that state is maintained. Next, it is judged whether the print data received can be interpreted by the language interpretation program stored in the RAM 33, or, in other words, whether the kind of the language and version of the print data coincide with the kind of the language and version of the language interpretation program (S1108). This is processing for coping with an exception such as occurrence of an accident, since mismatch of these can not occur in normal processing. As a result, in case of mismatch, error processing is performed, for example, by terminating the printing (S1420). On the other hand, in the case of coincidence, printing is performed according to the language interpretation program and the printer control program stored in the RAM 1033 (S1419). When the printing is finished, then, the job processing flag 1405 of the status information is cleared (S1421), and reception of next data is awaited.

Hereinabove, operation of the printer system according to the present embodiment has been described.

In the case where image data are sent as the print data, then, it is sufficient to omit the parts relating to the language interpretation program from the above-described configuration and processing, and to provide a processing unit for developing image data into image data, within a computer 1010. Thus, there is no essential difference.

Further, even in the case where control language is sent as print data, the language interpretation program may be sent together with print data without depending on a state of storage of the language interpretation program in the printer 1030, since a language interpretation program generally has a small size. In that case, the computer 1010 always overwrites the language interpretation program that has been read, onto the language interpretation program storage area 1033*b* of the RAM 1033.

Further, an object of download from the computer 1010 to the printer 1030 is not limited to a program, and may be a look-up table, screen data, or the like.

Further, in the case where a nonvolatile storage medium is employed as the RAM 1033, a language interpretation program and a printer control program may be recorded in advance at the time of shipping from a factory.

Thus, according to the present embodiment, overhead at printing can be reduced in a printing system where programs required for printer operation are downloaded from a computer. Further, according to the present embodiment, it is possible to realize a printing system where programs required for printer operation are downloaded from a computer, on a network including a plurality of computers.

What is claimed is:

1. A printing system including a printer and a plurality of computers each send print data to said printer, wherein:

each of said plurality of computers comprises:
  a storage means for storing a program required for printing processing of the printer; and
  a means for acquiring information regarding a program stored in the printer, previous to sending print data, for judging whether sending of the program stored in the computer is required, and for sending the program based on a result of the judgment; and said printer comprises a means for preventing reception of print data or a program from computers other than any one computer when print data or said program is received from said one computer, for storing the received program inside the printer, when a received object is the program, and for performing printing processing based on the received print data, according to the program stored inside the printer, when the received object is the print data.

2. A printer connected to a plurality of computers, said printer comprising:
  a storage area that can store programs required for printing processing of the printer;
  a means for outputting information regarding the programs stored in said storage area, in response to an inquiry from a connected computer; and
  a means for preventing reception of print data or programs from computers other than any one computer when print data or a program is received from said one computer, and for storing the received program into said storage area when a received object is the program, and for performing printing processing based on the received print data, according to the programs stored in said storage area, when the received object is the print data.

3. The printer according to claim 2, wherein:

said programs required for printing are a program for interpreting print data and programs for controlling operation of the printer.

4. The printer according to claim 3, wherein:

a part of said programs for controlling operation of the program is stored in advance in a storage area other than said storage area.

5. The printer according to claim 4, wherein:

said part stored in advance comprises at least one of a program for controlling communication with a computer, a program for receiving a program to receive from a computer, a program for initializing a printer, and a program for coping with an abnormal operation.

6. The printer according to claim 4, wherein:

the storage area other than said storage area is implemented on a nonvolatile storage medium; and said storage area for storing the received program is implemented on a volatile storage medium.

* * * * *